United States Patent
van Haalen et al.

(10) Patent No.: US 8,289,840 B2
(45) Date of Patent: Oct. 16, 2012

(54) COMMUNICATION NETWORK COMPRISING AT LEAST A SOURCE AND A SWITCH FOR RECEIVING AND FORWARDING DATA PACKETS ORIGINATED BY THE SOURCE

(75) Inventors: Ronald van Haalen, Nijmegen (NL); Arie Johannes de Heer, Twente (NL)

(73) Assignee: Alcatel Lucent, Paris (FR)

( * ) Notice: Subject to any disclaimer, the term of this patent is extended or adjusted under 35 U.S.C. 154(b) by 2310 days.

(21) Appl. No.: 10/621,060

(22) Filed: Jul. 16, 2003

(65) Prior Publication Data

US 2004/0017776 A1    Jan. 29, 2004

(30) Foreign Application Priority Data

Jul. 16, 2002   (EP) .................................... 02254976

(51) Int. Cl.
*G01R 31/08* (2006.01)
(52) U.S. Cl. ......... 370/218; 370/228; 370/352; 370/394
(58) Field of Classification Search .................. 370/217, 370/218, 225, 227, 228, 352, 412, 394, 244, 370/250, 389, 224; 340/3.43, 3.44, 825.01; 714/4

See application file for complete search history.

(56) References Cited

U.S. PATENT DOCUMENTS

| | | | | |
|---|---|---|---|---|
| 5,809,011 | A | 9/1998 | Almay | 370/218 |
| 6,028,861 | A * | 2/2000 | Soirinsuo et al. | 370/225 |
| 6,370,112 | B1 | 4/2002 | Voelker | 370/218 |
| 6,535,489 | B1 * | 3/2003 | Merchant et al. | 370/218 |
| 6,667,954 | B1 * | 12/2003 | Boduch et al. | 370/218 |

* cited by examiner

*Primary Examiner* — Ian N Moore
(74) *Attorney, Agent, or Firm* — Wall & Tong, LLP

(57) ABSTRACT

Communication network including a source and a switch for receiving and forwarding data packets originating from the source, wherein the network includes at least two mutually different routing paths between the source and the switch, wherein the switch includes at least two incoming ports for receiving the data packets originating from the source, wherein the switch is arranged to discard for a period of time any data packet originating from the source at the first one of the at least two incoming ports upon receiving a data packet originating from the source at the second one of the at least two incoming ports after receiving a data packet originating from the source at the first one of the at least two incoming ports.

16 Claims, 11 Drawing Sheets

COMMUNICATION NETWORK COMPRISING AT LEAST A SOURCE AND A SWITCH FOR RECEIVING AND FORWARDING DATA PACKETS ORIGINATED BY THE SOURCE

CROSS REFERENCE TO RELATED APPLICATION

This application claims priority of European Application No. 02254976.0 filed on Jul. 16, 2002.

FIELD OF THE INVENTION

The invention is related to a communication network comprising at least a source and a switch for receiving and forwarding data packets originating from the source, wherein the network comprises at least two mutually different routing paths between the source and the switch, wherein the switch comprises two incoming ports for receiving data packets originating from the source.

BACKGROUND OF THE INVENTION

Such communication network is known per se.

In use, one or more sources are directly or indirectly connected with the switch. If a source is directly connected with a switch, direct connections, referred to as paths, are for example present between the source and the switch. If a source is indirectly connected with the switch at least one other switch is present between the switch and the source. Between two switches there are often two mutually different routing paths. Each data packet generally comprises information with respect to the source the data packet originates from as well as information related to the destination address where to the data packet is sent. Each switch of the network is capable of extracting the information related to the destination address enabling the switch to forward the data packet into the right direction. Each switch is generally also capable of extracting from the data packet the source from which the packet originates.

In practice, there usually is a difference in length of time used for transferring a data packet originating from the source to the switch depending on the path used. The path followed over the network may sometimes have to be altered quickly during the transit of a number of data packets originating from the source. This need for a quick alteration of the path may, for instance, be a result of a link failure, a result of a desire to use a faster path, or the result of management action leading to the use of a different path. Such a quick change of a path may at some point in time lead to an arrival of the data packets at the switch in an order which is different from the order in which they were sent by the source.

For instance, let's assume that data packet X with a destination address B is sent from the source A before data packet Y with a destination address B is sent from the source A and that a change of path occurs during the transit of packet X and packet Y. If this change only leads to a new path for Y and this new path for Y is faster than the path used by X, packet Y will at some point arrive at the switch before packet X has arrived at that switch. In some uses of the network, such as the use of the network as a bridged Ethernet network, this re-ordering of the data packets during the transit causes problems with regard to the interpretation of such a re-ordered series of data packets at the final destination address B.

It should be noted that within the context of this specification data packets are said to have been re-ordered and an order of data packets is said to be different from an other order of the very same data packets if at least one data packet which was sent before an other data packet is received by a switch or a destination address after the other data packet has been received by that switch.

The problem of re-ordering during transit may be solved by providing each data packet with a sequence number to allow for ordering the data packets back into the order according to which the data packets were sent by the switch. This occurs in protocols such as TCP/IP. However, this leads to extra overhead in the length of a data packet and the packet processing.

It is an object of the invention to provide a communication network with a switch which is arranged to prevent re-ordering of data packets.

SUMMARY OF THE INVENTION

The object is achieved by a communication network according to the invention which is characterised in that the switch is arranged to discard for a period of time any data packet originating from the source at the first one of the at least two incoming ports upon receiving a data packet originating from the source at the second one of the at least two incoming ports after receiving a data packet originating from the source at the first one of the at least two incoming ports. This has the advantage that upon receiving a data packet originating from the source at the second one of the at least two incoming ports after receiving a data packet originating from the source at the first one of the at least two incoming ports another data packet from the source can for a period of time not be received at the first one of the at least two incoming ports. This other data packet originating from the source may have been sent from the source before the data packet received at the second one of the at least two incoming ports was sent from the source. By discarding this other data packet, re-ordering of data packets is prevented.

In a particular embodiment of a communication network according to the invention, the switch is further arranged to discard for a period of time any data packet originating from the source at all the at least two incoming ports apart from at the second one, upon receiving a data packet originating from the source at the second one of the at least two incoming ports after receiving a data packet originating from the source at the first one of the at least two incoming ports. In this case, at none of the at least two incoming ports apart from at the second one, data packets originating from the source are received. This is of particular interest in cases where the switch "learns" from the port at which a data packet originating from the source is received, which path should be followed by a data packet with the destination address of that source. In other words, if a switch receives a given data packet with a destination address, the switch will forward that given data packet from the port at which it has just received another data packet from the source with that destination address. When packets from a certain source address arrive alternatingly at two ports of the same switch, also the forwarding of data packets to this source address will alternatingly occur from these two ports. The negative effect is that packets are likely to get lost. However, this particular embodiment prevents the continuous changing of ports from which data packets are forwarded.

In one embodiment of a communication network according to the invention, the period of time lasts till the switch is informed that re-ordering of the data packets originating from the source is no longer possible. This may be due to a management action or for instance to the fact that it is known that a last data packet of a series of data packets has arrived at its destination address. The predetermined length of time can be set such that it is highly likely that within the length of time a complete series of data packets will arrive at only one port of the switch.

Preferably the communication network according to the invention is characterized in that, the communication network is used by an Ethernet Network.

The invention is further related to a switch for use in a communication network which further comprises a source and, when the switch is in use, at least two mutually different routing paths between the source and the switch, wherein the switch is arranged to receive and forward data packets originating from the source, wherein the switch comprises at least two incoming ports for receiving the data packets originating from the source.

The invention is further related to a switch for use in such a communication network.

BRIEF DESCRIPTION OF THE DRAWINGS

The invention is herebelow explained by the following, non limiting example as illustrated in the drawing. Herein shows.

DETAILED DESCRIPTION

Figure 1:
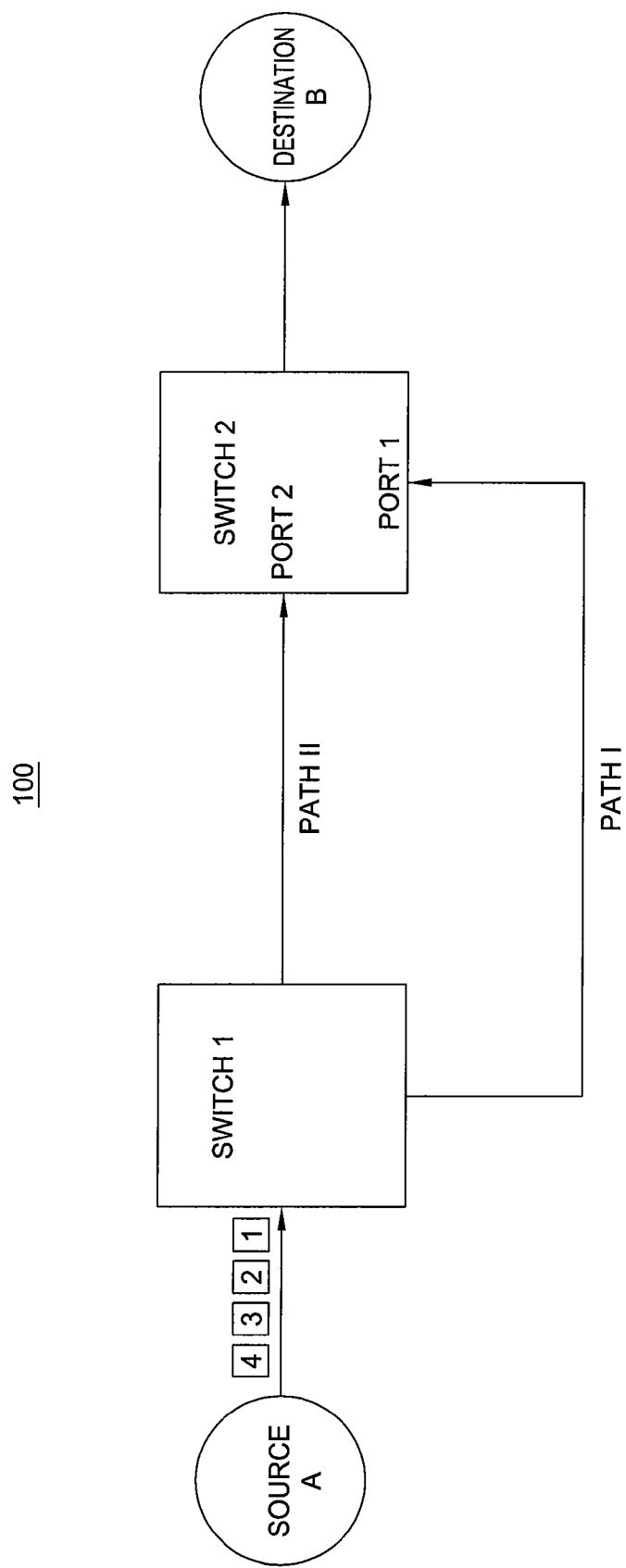
FIG. 1 schematically a communication network according to the invention during a first stage of use.
Figure 2:
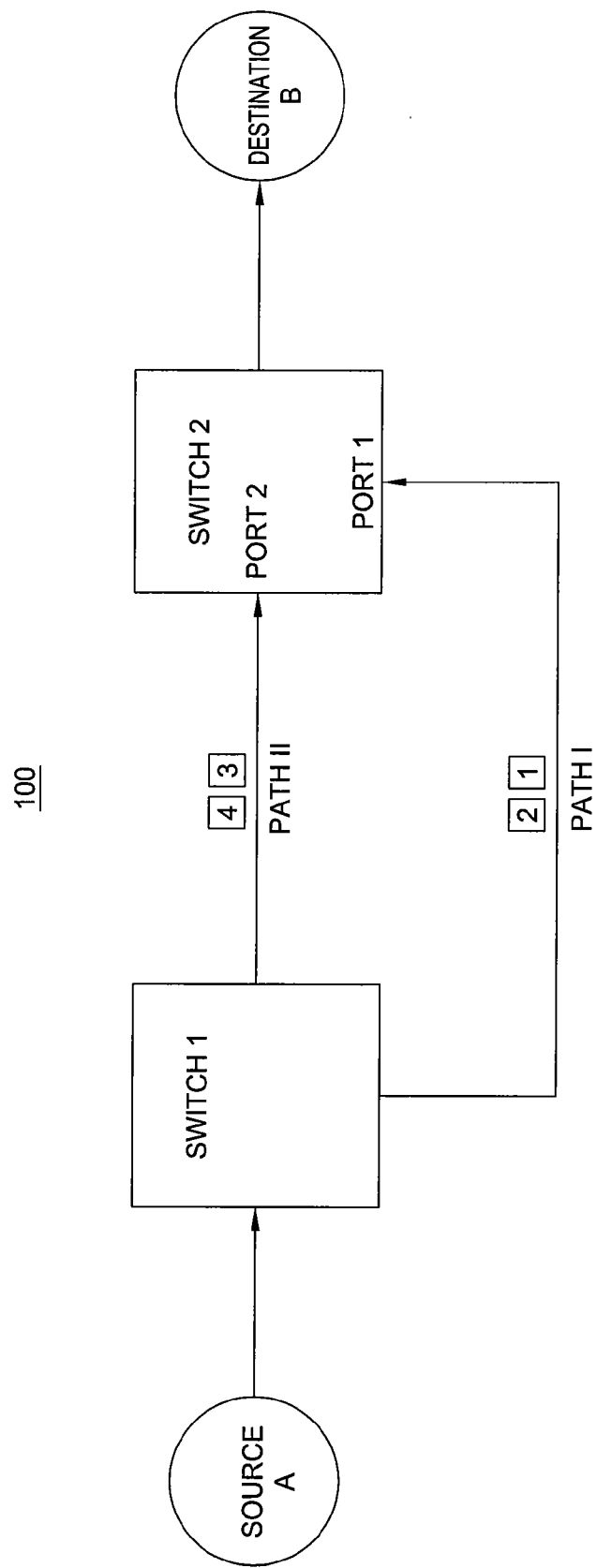
FIG. 2 schematically the communication network of FIG. 1 during a second stage of use.
Figure 3:
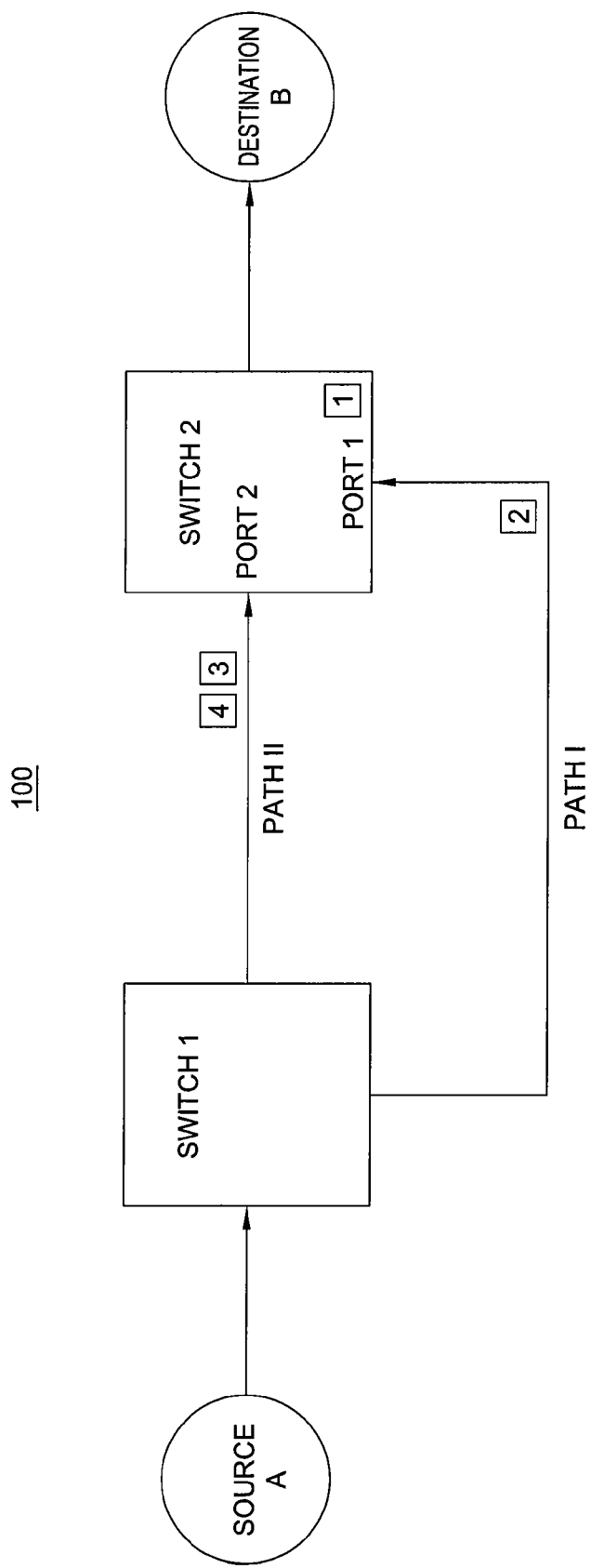
FIG. 3 schematically the communication network of FIG. 1 during a third stage of use.
Figure 4:
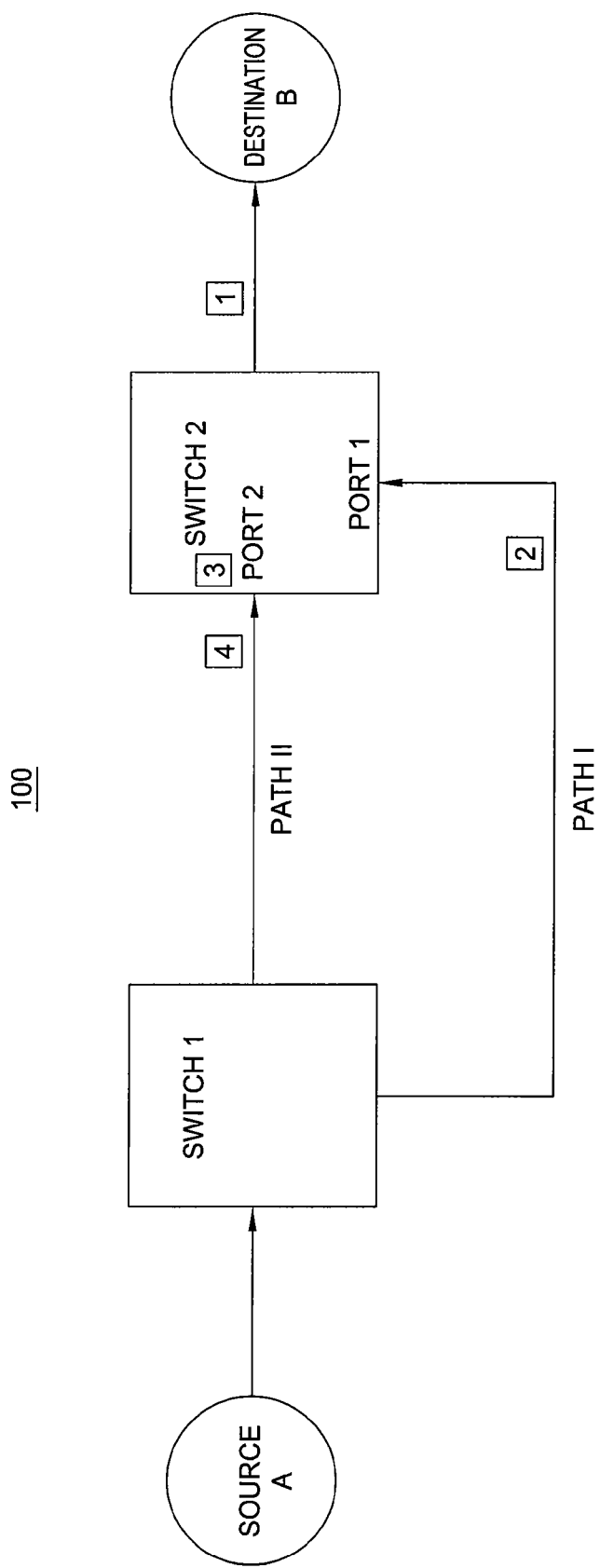
FIG. 4 schematically the communication network of FIG. 1 during a fourth stage of use.

FIG. 1 shows a communication network 100 comprising switch 1 and a switch 2. The network 100 comprises between the switch 1 and switch 2, path I and path II. Switch 2 comprises a port 2 for receiving packets originating from source A as forwarded by switch 1 along path II and a port 1 for receiving packets forwarded by switch 1 along path I. From source A the packets 1,2,3,4 are addressed and sent to destination B. After forwarding data packet 1,2 from switch 1 along path I the route from switch 1 to switch 2 is changed from path I to path II, as shown in FIG. 2. Hence, data packets 3,4 are forwarded along path II towards switch 2. Path II is in this example faster than path I. FIG. 3 shows that data packet 1 is received at port 1 of switch 2, while data packet 2 is still traveling along path I and data packets 3,4 are still traveling along path II. As path II is faster than path I, data packet 3 is received at port 2 of switch 2 before data packet 2 has arrived at port 1 of switch 2. This is shown in FIG. 4.

Figure 5:
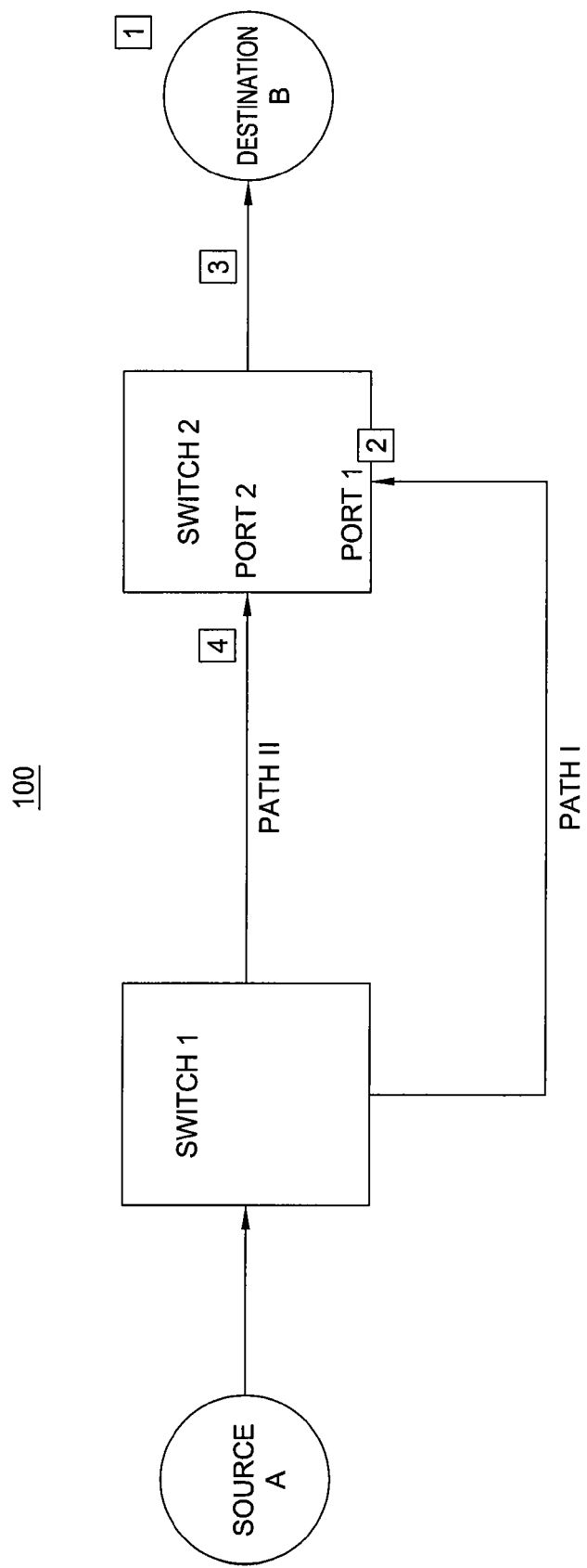
FIG. 5 schematically the communication network of FIG. 1 during a fifth stage of use.
Figure 6:
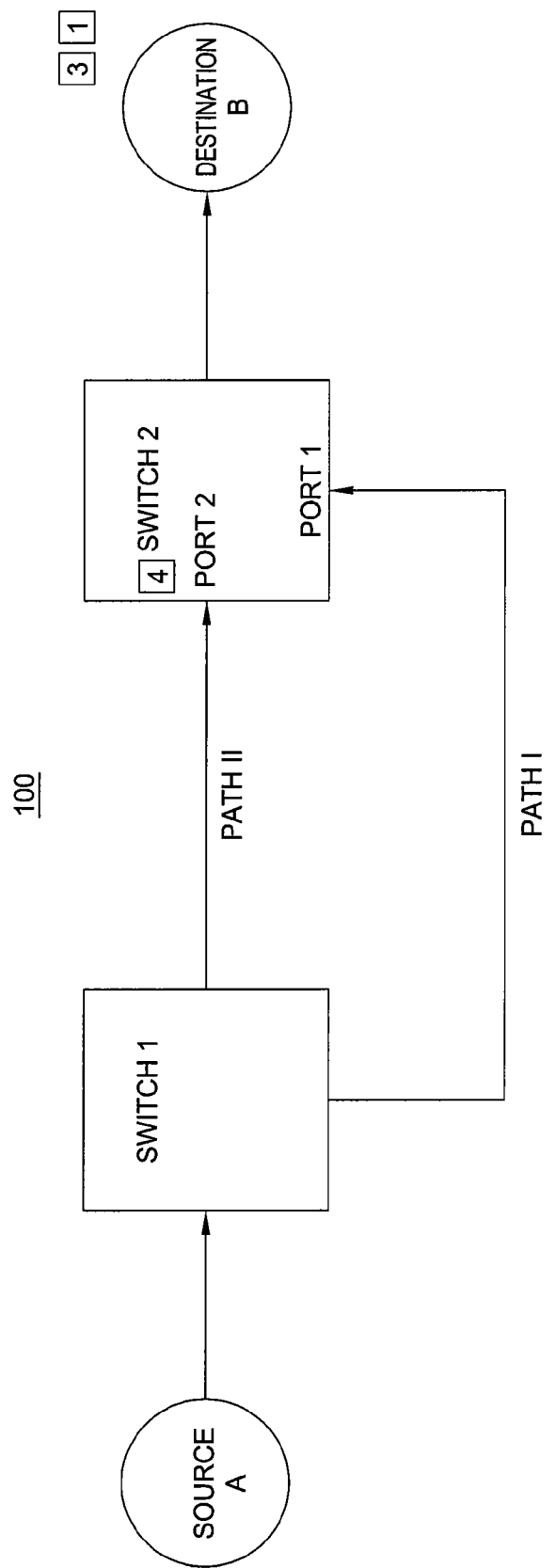
FIG. 6 schematically the communication network of FIG. 1 during a sixth stage of use.
Figure 7:
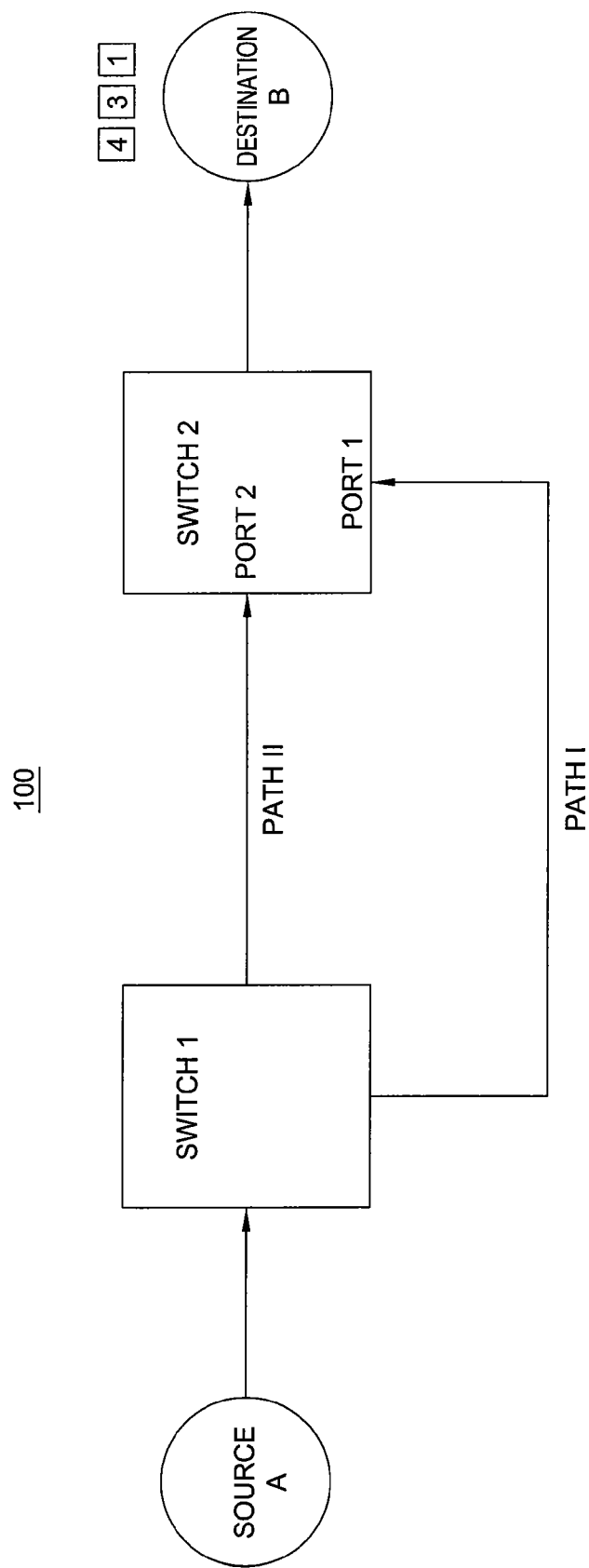
FIG. 7 schematically the communication network of FIG. 1 during a seventh stage of use.
Figure 8:
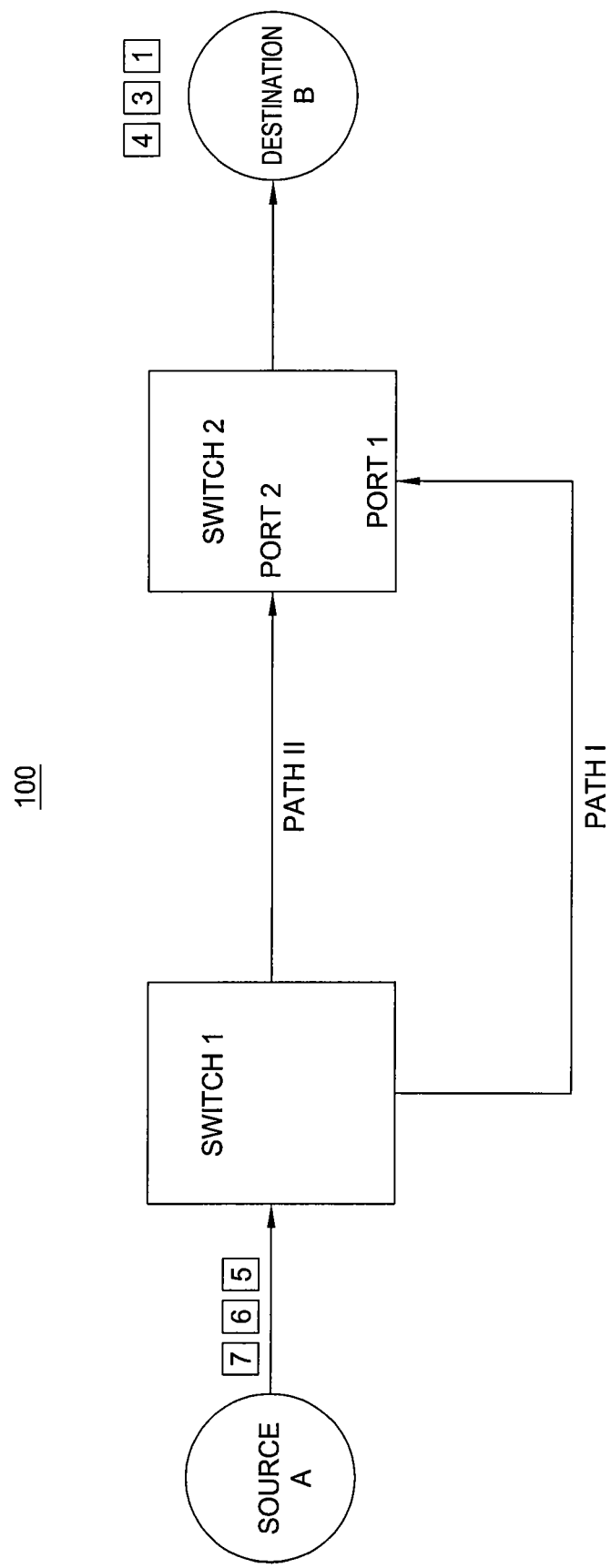
FIG. 8 schematically the communication network of FIG. 1 during a eighth stage of use.
Figure 9:
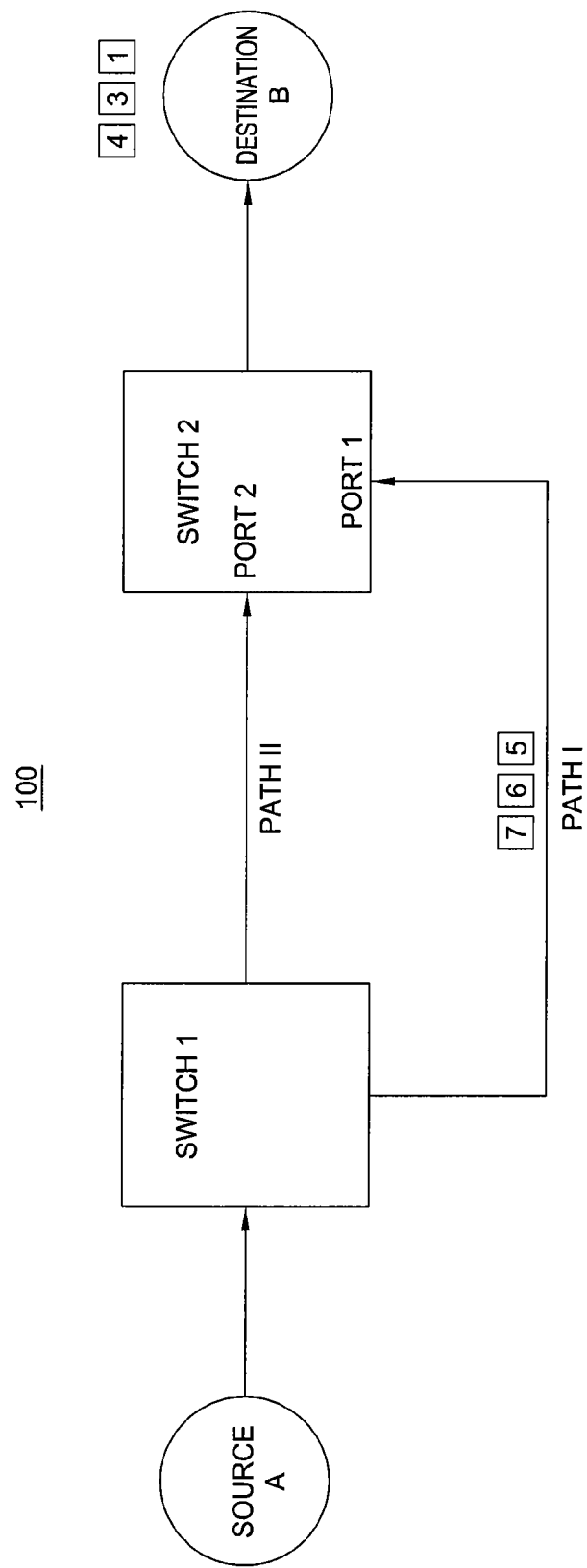
FIG. 9 schematically the communication network of FIG. 1 during a ninth stage of use.
Figure 10:
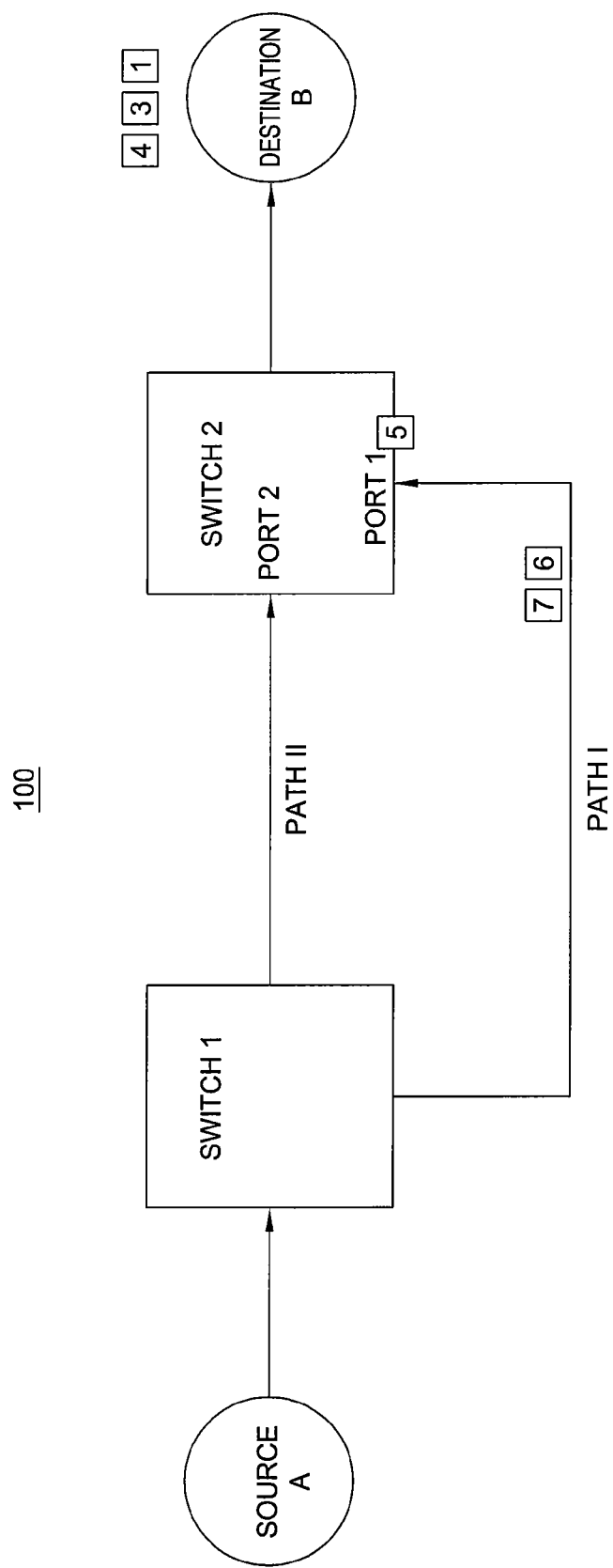
FIG. 10 schematically the communication network of FIG. 1 during a tenth stage of use FIG. 11 schematically the communication network of FIG. 1 during a eleventh stage of use.
Figure 11:
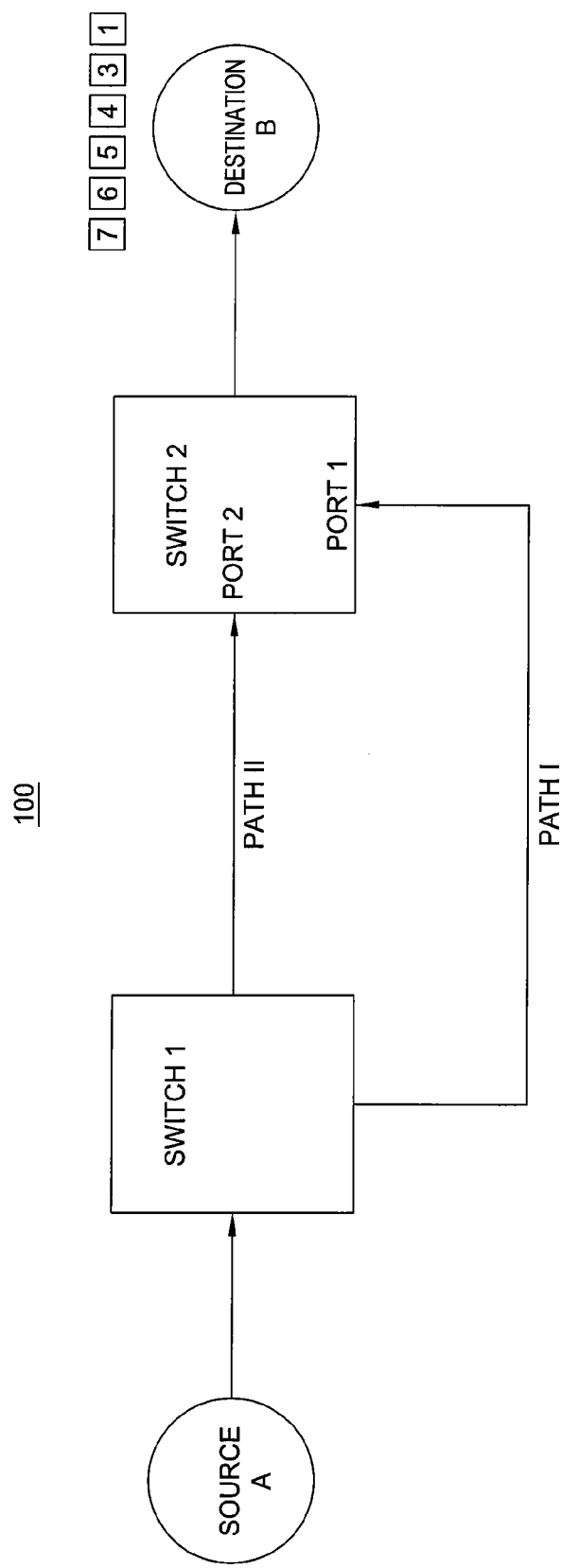

According to the invention, in this situation data packets arriving at port 1 are for a period of time discarded once data packets forwarded by switch 1 are received at port 2 of switch 2. FIG. 5 shows in accordance with the invention that data packet 2 is not forwarded by switch 2 to destination B and FIG. 6 shows that data packet 2 is discarded by port 1 while data packet 4 is received at port 2 of switch 1. Within the context of this specification receiving a data packet implies accepting the data packet and if needed forwarding the data packet. Discarding a data packet implies not accepting the arrival of a data packet. It follows that data packet 4 is not discarded and is forwarded by switch 2 towards destination address B, finally leading to the arrival of data packets 1,3 and 4 at destination address B as shown in FIG. 7.

It is of course also possible that switch 2 comprises many more ports port 1, port 2 . . . port x for receiving data packets forwarded by the particular switch 1. In that case it is possible that instead of discarding data packets for a period of time only at port 1 upon receiving data packets at port 2, data packets are for a period of time discarded at all other ports 1 . . . port x apart from at port 2.

It is equally possible that the source is capable of sending data packets via two or more different paths to switch 1. Re-ordering is in this case prevented as long as switch 1 is arranged as switch 2, i.e. according to the invention. In other words, as long as switch 1 is arranged to discard for a period of time any data packet originating from source A at port 1 upon receiving a data packet originating from source A at port 2 after receiving a data packet originating from the source at port 1, re-ordering is prevented.

Although the example only shows one source, it is also possible that a plurality of sources is capable of sending data packets to switch 1. As a switch is capable of extracting from the data packet information related to the source from which the data packet originates, the switch may according to the invention at one or more ports discard or accept data packets depending on the source from which the data packet originates.

A period of time may last till switch 2 is informed that re-ordering of the data packets originating from source A is no longer possible. It is however also possible that the period of time has a predetermined length of time which is for instance chosen such that it is unlikely that re-ordering is still possible once the predetermined length of time has passed. FIG. 8 to FIG. 11 illustrate the situation after expiration the period of time, either due to the fact that the period of time comprises a predetermined length of time which has passed, or due to the fact that the switch has been informed that re-ordering of the data packet is no longer possible. Data packets 5,6,7 from source address A may for instance again be forwarded by switch 1 along path I towards switch 2. These data packets are in that case received by port 1 and all forwarded by switch 2 towards destination address B.

The communication network according to the invention is especially suitable if used by an Ethernet network.

It is of course possible that in a communication network according to the invention each switch comprises a switch which is being arranged to discard for a period of time any data packet originating from a source at port p1 upon receiving a data packet originating from that source at port p2 after receiving a data packet originating from the source at port 1. A network may comprise many switches and many paths between the switches. It is also possible that to each switch a number of end stations are connected. All these end stations have an address. Each of these variations and extensions are understood to fall within the framework of the invention as defined by the appended claims.

The invention claimed is:

1. A communication network, comprising:
   at least two mutually different routing paths for commonly sourcing data packets; and a switch having a plurality of inputs respectively coupled to the routing paths for receiving the data packets, and an output for forwarding the data packets, the switch configured to discard or accept data packets depending on the source from which the data packets originate;

wherein in response to a data packet being received out of order at a first of the plurality input ports, data packets received at the first input port are discarded for a period of time while data packets received at the other input ports are processed, such that the data packets forward on the output are in correct packets order and further allow less of a number of bits to be forwarded than were transmitted.

2. The communication network according to claim 1, wherein in response to a commonly sourced data packet being received out of order at a second of the plurality input ports, commonly sourced data packets received at all of the input ports are discarded for a period of time.

3. The communication network according to claim 1, wherein the period of time lasts until the switch is informed that re-ordering of the commonly sourced data packets is no longer possible.

4. The communication network according to claim 1, wherein the period of time has a predetermined length of time.

5. The communication network according to claim 1, wherein the communication network is used by an Ethernet Network.

6. A switch for use in a communication network, the switch receiving data packets having a packet order, determining whether the received data packets are in correct order, and forwarding the received data packets in correct packet order, the switch comprising:

at least two incoming ports for receiving data packets via respective routing paths and an output port for forwarding data packets, said data packets are discarded or accepted depending on the source from which the data packets originate;

wherein in response to a commonly sourced data packet being received out of order at a first of the plurality input ports, commonly sourced data packets received at the first input port are discarded for a period of time while commonly sourced data packets received at the other input ports are processed to thereby allow less of a number of bits to be forwarded than were transmitted.

7. The switch according to claim 6, wherein:

in response to a commonly sourced data packet being received out of order at a second of the plurality input ports, commonly sourced data packets received at all of the input ports are discarded for a period of time.

8. The switch according to claim 6, wherein the period of time lasts until the switch is informed that re-ordering of the commonly sourced data packets is no longer possible.

9. The switch according to claim 6, wherein the the period of time has a predetermined length of time.

10. The switch according to claim 6, wherein the communication network is used by an Ethernet Network.

11. A switch configured for receiving data packets having a packet order, determining whether the received data packets are in correct order, and forwarding the received data packets in correct packet order, comprising:

a plurality of input ports for successively receiving said data packets from a respective plurality of routing paths; and an output port for forwarding data packets, said data packets are discarded or accepted depending on the source from which the data packets originate;

wherein in response to a data packet being received out of order at a first of any one of the plurality input ports, data packets are discarded for a period of time at the first input port while being allowed at the other input ports thereby allowing less of a number of bits to be forwarded than were transmitted.

12. The switch of claim 11, wherein the data packets are forwarded without the discarded data packets received at the first of the input ports.

13. The switch of claim 11, wherein the period of time is a predetermined period of time.

14. The switch of claim 11, wherein the period of time is terminated in response to a determination that a data packet condition is no longer possible.

15. The switch of claim 13, further configured to discard data packets for the period of time at all input ports apart from a single input where data packets are determined to be arriving in the correct order.

16. The switch of claim 15, wherein only data packets from the single input where data packets are determined to be arriving in the correct order are forwarded.

* * * * *